United States Patent [19]

Simpson

[11] 4,436,163

[45] Mar. 13, 1984

[54] ARRANGEMENT FOR CONVERTING ROTARY MOTION TO RECIPROCATORY MOTION

[75] Inventor: Frank F. Simpson, Staines, England

[73] Assignee: Black & Decker Inc., Newark, Del.

[21] Appl. No.: 266,156

[22] Filed: May 22, 1981

Related U.S. Application Data

[63] Continuation-in-part of Ser. No. 102,688, Dec. 12, 1979.

[30] Foreign Application Priority Data

Dec. 13, 1978 [GB] United Kingdom ............... 48305/78

[51] Int. Cl.³ ........................ B23B 45/02; B23B 45/16
[52] U.S. Cl. ................................ 173/117; 74/22 R; 74/50; 173/109; 173/118
[58] Field of Search ............... 30/392; 74/22 R, 22 A, 74/50; 173/48, 109, 110, 117, 118

[56] References Cited

U.S. PATENT DOCUMENTS

| | | | |
|---|---|---|---|
| 2,015,267 | 9/1935 | Granberg | 74/22 R X |
| 2,166,111 | 7/1939 | Bancroft | 74/22 R |
| 2,385,439 | 9/1945 | Gubbins | 73/117 X |
| 2,480,854 | 9/1949 | Hardman | 74/50 |
| 2,668,567 | 2/1954 | Olson | 30/392 |
| 2,948,158 | 8/1960 | Norlin | 74/22 R |
| 3,380,116 | 4/1968 | Cox et al. | 74/22 R X |
| 4,026,196 | 5/1977 | Olofsson | 74/22 R X |
| 4,346,769 | 8/1982 | Simpson | 173/118 |

FOREIGN PATENT DOCUMENTS

| | | | |
|---|---|---|---|
| 945820 | 5/1949 | France | 74/50 |
| 946280 | 5/1949 | France | 74/50 |
| 606683 | 8/1948 | United Kingdom | 74/50 |
| 1078960 | 8/1967 | United Kingdom . | |
| 1467531 | 3/1977 | United Kingdom . | |

Primary Examiner—Wm. Carter Reynolds
Attorney, Agent, or Firm—Edward D. Murphy; Harold Weinstein

[57] ABSTRACT

A power operated tool includes a prime mover, an output member and a power transmission mechanism arranged to transmit rotary motion of the prime mover to a reciprocatory output member. The power transmission mechanism includes a first member mounted for reciprocating motion, a link coupled at one end to the first member, and a second member mounted for rotation about an axis transverse to the path of reciprocating motion of the first member. The arrangement is such that rotation of the second member reciprocates the first member and also imparts a cyclic partial rotation to the first member during said reciprocation. The second member has a bore therein spaced from the axis of rotation and inclined there towards. The bore has an axis which intersects the axis of rotation at an angle of about one quarter of the angle through which the first member partially rotates.

4 Claims, 17 Drawing Figures

ARRANGEMENT FOR CONVERTING ROTARY MOTION TO RECIPROCATORY MOTION

RELATED APPLICATION

This application is a Continuation-in-Part of co-pending Application Ser. No. 102,688 filed Dec. 12, 1979.

FIELD OF THE INVENTION

This invention relates to power operated tools incorporating a mechanism for converting rotary motion to reciprocatory motion.

BACKGROUND OF THE INVENTION

One known mechanism used in such a tool is the crank and connecting rod mechanism in which a first member to be reciprocated is pivotably connected to one end of a connecting rod whose other end is rotatably mounted on a crank, the axis of rotation of the crank being perpendicular to the path of reciprocation. This mechanism is quite satisfactory for a wide range of applications but in some circumstances the fact that the motion of the reciprocated member is not Simple Harmonic Motion is a disadvantage. Also the mechanism is necessarily quite long, especially if motion approximating to Simple Harmonic Motion is to be achieved, and this can in some circumstances be a disadvantage. One known alternative to the connecting rod is the "Scotch Yoke" mechanism. In this mechanism the crank pin is mounted in a slot or guide channel on the member to be reciprocated, the slot or channel extending perpendicular to the path of reciprocation. This mechanism has the advantage that it is much more compact than the connecting rod mechanism and that the motion of the reciprocated member is Simple Harmonic Motion. However, in order to avoid excessive wear of the coupling between the crank pin and the slot or guide the construction of the mechanism must be quite sophisticated and consequently this "Scotch Yoke" mechanism is unduly expensive for certain applications.

SUMMARY OF THE INVENTION

It is an object of the present invention to provide a power operated tool incorporating an improved mechanism for converting rotary motion to reciprocatory motion.

It is a further object of the invention to provide such mechanism in a simple and compact form.

It is yet another object of the invention to reduce to cost of such mechanism in a power operated tool.

According to the invention a power operated tool includes a prime mover, a working output member and a power transmission mechanism arranged to transmit motion of the prime mover to the working output member, the power transmission mechanism including a first member mounted for reciprocatory motion, a link coupled at one end to the first member, and a second member mounted for rotary motion about an axis transverse to the path of reciprocatory motion of the first member and coupled to the other end of the link at a position spaced from the axis of rotation of the second member, the arrangement being such that, in use, the prime mover rotates the second member which reciprocates the first member and also imparts a cyclic partial rotation to the first member during said reciprocation.

This form of power transmission mechanism has considerable advantages when incorporated in a power operated tool. In particular it shares the advantage of compactness of the "Scotch Yoke" mechanism but avoids the complicated and expensive coupling required with a "Scotch Yoke" mechanism.

The link may be rigidly connected to the first member and may be integral with the first member. Thus whereas in a "Scotch Yoke" mechanism the link must be coupled to the first member in a manner that allows both relative sliding and relative rotation, in the transmission mechanism of the present invention the link may be fixed to the first member.

The other end of the link may be mounted for swivelling and sliding movement relative the second member. Whereas in the "Scotch Yoke" mechanism the crank pin must slide along the guide a distance equal to the stroke of the first member, in the transmission mechanism of the present invention the sliding movement can be very much shorter.

The sliding movement may be parallel to the axis of rotation of the second member. In one such arrangement, the end of the link is pivotally connected to a bush which is slidably and rotatably mounted in the second member. In another such arrangement which is particularly simple and cheap the end of the link is formed with a rounded end mounted in a bore of the second member for sliding and swivelling movement within the bore.

In an alternative arrangement the end of the link is slidably mounted in a rounded bush which is mounted for swivelling movement relative to the second member.

The link may be slidably mounted at said one end on the first member for sliding movement transverse to the path of reciprocatory motion of the first member, the other end of the link being mounted for swivelling movement relative to the second member.

The second member may be in the form of a crank disc or a crank arm having coupling means eccentrically mounted thereon for coupling the link to the second member.

In certain applications a partial rotation of the first member is advantageous: for example in a pneumatic tool it may be desirable for the first member to cover over certain ports during its forward stroke and for the ports to be open during its return stroke. If such a partial rotation of the member to be driven is, however, undesirable, a third member may be provided, the third member being rotatably coupled to the first member in such a way that the reciprocation and partial rotation of the first member imparts reciprocation but not rotation to the third member.

According to another aspect of the invention a power tool comprises an electric motor and a mechanism arranged to be driven by the electric motor and reciprocate an operating tool member when present. Said mechanism comprises a first member mounted for reciprocatory motion, a second member mounted for rotary motion about an axis at right angles to the axis of reciprocatory motion of said first member, and a link coupled at one end to said first member and at the other end to said second member at a position spaced from the axis of rotation of the second member such that rotation of the second member reciprocates the first member and also imparts a cyclic partial rotation to the first member during said reciprocation.

The first member may be the piston or cylinder of an air spring hammer arrangement. Alternatively the first member may be drivingly connected to the piston or cylinder of an air spring hammer arrangement.

Said other end of the link may be coupled to the second member in a manner that allows sliding movement of the link relative to the second member in a direction parallel to the axis of rotation of the second member. With this arrangement the link can be aligned with the direction of sliding movement at the ends of the path of reciprocatory motion of the first member but is inclined to the direction of sliding movement in the middle portion of the path of reciprocatory motion. In order to accommodate the inclination at least a portion of the link may need to be of narrow cross-section and so that the link is sufficiently strong this may result in the link having to be made of particularly strong and therefore expensive material.

According to another feature of the invention said other end of the link is coupled to the second member in a manner that allows sliding movement of the link relative to the second member in a direction inclined to the axis of rotation of the second member and diverging away from the axis of rotation with increasing distance from said one end of the link. With this arrangement, which at first might seem undesirable since the link is never aligned with the direction of sliding movement, the inclination of the link to the direction of sliding movement in the middle portion of the path of reciprocating motion is reduced and accordingly the link can be made of greater cross-section which allows the link to be made more cheaply. This arrangement also helps to balance the forces applied to the first member when it is driven by the second member.

The mechanism may be incorporated in a wide variety of power operated tools. For example the mechanism may be used in pneumatic tools; in particular the mechanism may be used to drive the piston of a pneumatic hammer drill or it may be used to drive the piston of a compressor, in which case partial rotation of the piston enabling selective covering over of ports may be a considerable advantage. The mechanism is applicable to hydraulic devices as well as pneumatic devices; for example the mechanism may be used in a hydraulic pump.

The mechanism may also be used in power operated reciprocating tools whether or not they are pneumatically operated. For example the mechanism may be used in a jig saw, a zimmer saw or special purpose tools such as a cylindrical hone or a filing machine.

BRIEF DESCRIPTION OF THE DRAWINGS

Specific embodiments of the invention will now be described in greater detail with reference to the accompanying drawings, in which.

DETAILED DESCRIPTION OF THE PREFERRED EMBODIMENTS

Figure 1:
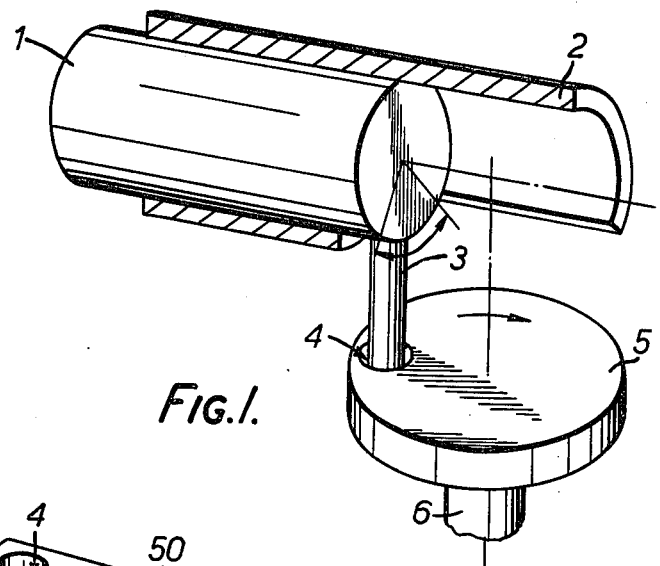
FIG. 1 is a diagrammatic perspective view, partly in section, of a first form of mechanism which may be incorporated in a power-operated tool.

Referring first to FIG. 1, there is shown a mechanism for converting rotary motion to reciprocatory motion comprising a piston member 1, which forms said first member, mounted in a cylindrical guide tube 2 for reciprocating movement along the tube. A link 3 is attached at one end to one end of the piston member 1 and at its other end the link 3 is received in a bore 4 near the edge of a crank disc 5. The crank disc 5, which forms said second member, has a drive shaft 6 which in use is rotated by a motor (not shown). The link 3 is arranged in the bore 4 in such a way as to permit the link 3 to swivel in the bore and to slide up and down the bore; suitable arrangements for providing this coupling will be described later with reference to FIGS. 5, 6, 7A, 14A and 14B.

FIG. 1 shows the piston member 1 in its most forward position with the link 3 vertical and lying in the same plane as the axis of reciprocation of the piston member 1 and the axis of rotation of the crank disc 5, the latter axis being at right angles to the former axis. When, in use, the crank disc is rotated in the direction of the arrow by a prime mover (not shown), the lower end of the link 3 is drawn backwards and sideways; the backwards movement of the lower end of the link 3 is accommodated by the piston member 1 being drawn backwards; the sideways movement of the lower end of the link 3 is accommodated by pivotal movement of the link 3 which in turn causes partial rotation of the piston member 1 about its own axis. The pivotal movement of the link 3 causes the ink to swivel relative to the crank disc 5 and also causes the link to rise up the bore 4. Once the crank disc has rotated through a quarter turn from the position shown in FIG. 1, the link 3 is in its most inclined position and the piston member 1 is at the limit of its partial rotation and is at the centre of its path of reciprocation. During the next (second) quarter turn of the crank disc 5 the link 3 returns to the orientation shown in FIG. 1 but the piston member 1 continues its rearward movement and finally reaches the rearward end of its stroke. During the next (third) quarter turn of the crank disc 5 the link 3 pivots to the opposite side causing partial rotation of the piston member 1 in the opposite direction and the piston member 1 travels the first half of its return stroke. During the final (fourth) quarter turn of the crank disc 5, the link 3 returns to the orientation shown in FIG. 1 and the piston member 1 completes its return stroke.

Since the link 3 is always located in a vertical plane throughout the rotation of the crank disc 5, and this vertical plane reciprocates with the piston member 1, the reciprocatory motion of the piston member 1 is Simple Harmonic Motion. The partial cyclic rotation of the piston member 1 is a modified form of Simple Harmonic Motion and is 90 degrees out of phase with the reciprocatory motion. Thus for almost all of the forward stroke of the piston member 1 the piston member is rotated to one side of its central position and for almost all of the return stroke the piston member is rotated to the opposite side of its central position. This makes it simple to arrange for ports (not shown) in the guide tube 2 to be covered during the forward stroke of the piston member and uncovered during its rearward stroke (or vice versa if desired).

Figure 2:
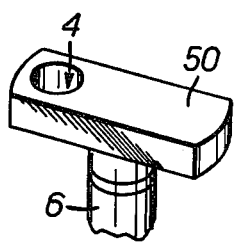
FIG. 2 is a perspective view of a modified part of the mechanism of FIG. 1.

The crank disc 5 shown in FIG. 1 may be replaced by the crank arm 50 shown in FIG. 2.

Figure 3:
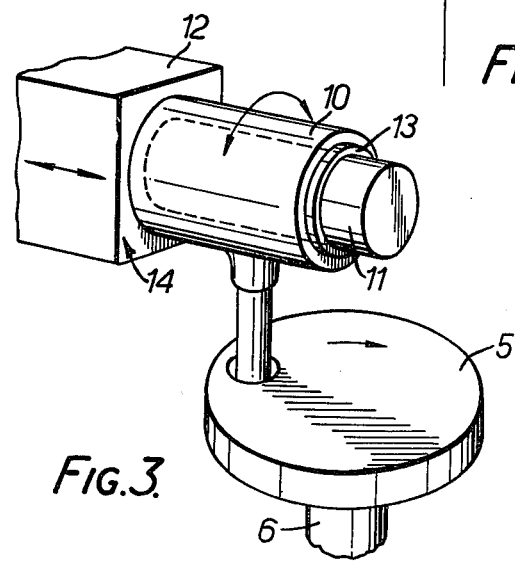
FIG. 3 is a diagrammatic perspective view of a second form of the mechanism of FIG. 1.

In a case where reciprocation of a member without rotation is desired the arrangement shown in FIG. 3 can be used. In this arrangement the upper end of the link 3 is connected to a hollow cylindrical member 10 which is rotatably mounted on a shaft 11 projecting from a piston member 12. The hollow cylindrical member 10 is held in fixed axial relationship with the piston member 12 by a collar 13 on the shaft 11 and by an abutment face 14 on the piston member 12. Thus when the crank disc 5 is rotated although the cylindrical member 10 is subjected to a cyclic partial rotation the piston member 12 reciprocates without rotation.

Figure 4:
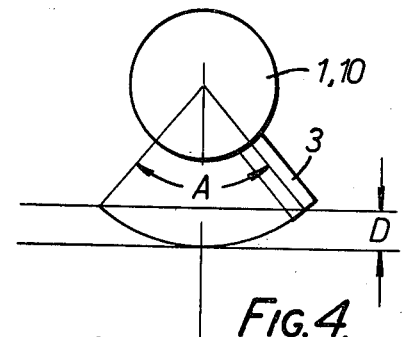
FIG. 4 is a diagram showing the amplitude of certain movements in the mechanism.

FIG. 4 shows the amplitude of the angular movement of the link 3 and of the sliding of the link 3 relative to the bore 4 during rotation of the crank disc 5 for any of the mechanisms of FIGS. 1 to 3. The angle A which is of the order of 80° in this particular example is the amplitude of the angular movement of the link 3 and the distance D is the amplitude of the movement of the link 3 in the bore 4.

In order to accommodate the movement of the link 3 in the bore 4 one of the arrangements shown in FIGS. 5, 6, 7A and 7B may be adopted.

Figure 5:
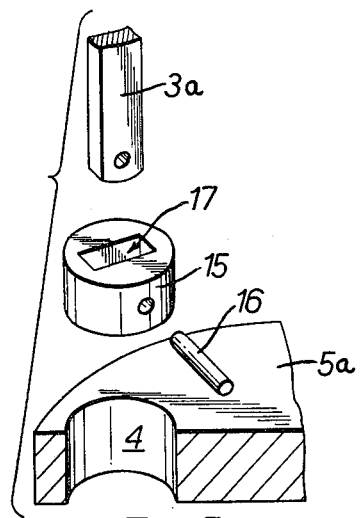
FIGS. 5, 6, 7A and 7B are diagrammatic exploded views, with some parts in section, of various forms which parts of the mechanism of each of FIGS. 1 to 3 may take.

In FIG. 5 the link 3a is of rectangular cross-section and is pivotably mounted in a cylindrical bush 15 by a pin 16 carried in the bush. The bush as a bore 17 for receiving the end of the link 3a; the cross-section of the bore 17 is rectangular, the shorter dimension being matched to the thickness of the link 3a and the longer dimension being greater than the width of the link so as to allow the link to pivot relative to the bush 15. The bush 15 is slidably and rotatably mounted in the bore 4 of the crank disc 5a.

Figure 6:
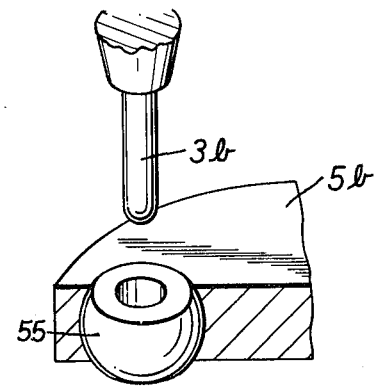

In FIG. 6 the link 3b is slidably mounted in a ball-shaped bush 55, which is located in a similar ball-shaped socket in the crank disc 5b. As shown the link 3b is of round cross-section but the link 3b may be of rectangular cross-section and located in a bore of rectangular cross-section in the bush 55 since the link 3b does not have to rotate relative to the bush 55.

Figure 7A:
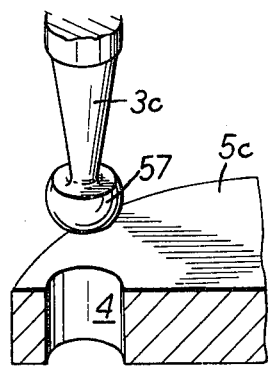

In FIG. 7A the link 3c is formed with an integral ball-shaped head 57 at its end and this end is received in the bore 4 of the crank disc 5c, the bore 4 being in this case of circular cross-section.

Figure 7B:
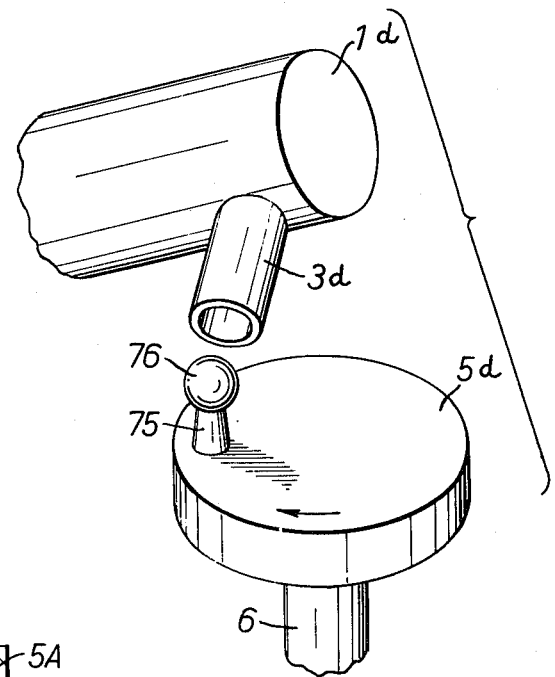

In FIG. 7B the link 3d is formed as a hollow tube and the crank disc 5d has a pin 75 formed with a ball-shaped head 76 projecting upwardly from the crank disc. The ball shaped head 76 is received in the bore of the link 3d thereby providing a coupling of the link 3d to the crank disc 5d that is functionally similar to the coupling shown in FIG. 7A.

Figure 14A:
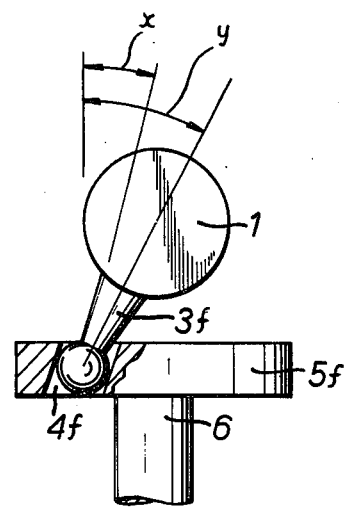
FIGS. 14A and 14B are diagrammatic part sectional elevational views illustrating a particular modification of the invention which may be made to each of the mechanisms shown in FIGS. 1 through 7.
Figure 14B:
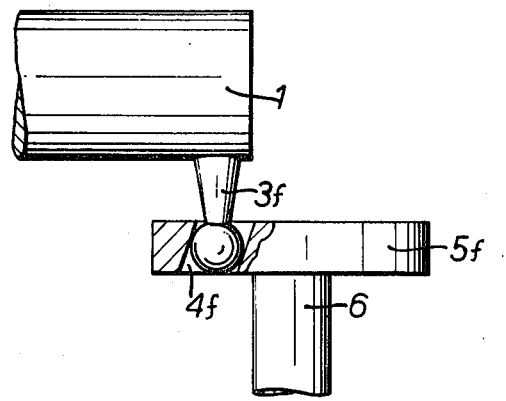

FIGS. 14A and 14B show a modification to the bore 4 which can be incorporated in any of the arrangements shown in or combined from any of FIGS. 1, 2, 3 and 7A. As specifically shown in FIGS. 14A and B, the link 3f is rigidly connected at one end to the piston member 1 and has at the other end a rounded head which slides and swivels in the bore 4f. In the modification the bore 4f is inclined to the axis of rotation of the crank disc 5f and diverges away from the axis of rotation of the crank disc with increasing distance from the upper end of the link 3f towards the lower end of the link 3f; put another way, the bore 4f is inclined towards the axis of rotation of the crank disc 5f in the general direction of the link 3f from the lower end of the link 3f to the upper end thereof. The axis of the bore 4f and the axis of rotation of the crank disc 5 are coplanar and the inclination x of the bore 4f to the axis of rotation of the crank disc 4f is chosen to be about half the maximum inclination y of the link 3f to that axis of rotation. It will be appreciated that the bore 4f is eccentric to the axis of rotation of the crank disc 5f.

FIG. 14A, which is an end elevational view, shows the mechanism in the mid-stroke position and it can be seen from the drawing that the inclination of the link 3f to the bore 4f is halved over that inclination y which would pertain with a non-inclined bore. FIG. 14B, which is a side elevational view, shows the mechanism in the forward end-stroke position and it can be seen from the drawing that the link 3f is now inclined to the bore 4f whereas with a non-inclined bore the link would be aligned with the bore; the angle of inclination between the link 3f and the axis of the bore 4f in the end-stroke position is about the same as in the mid-stroke position. It will be appreciated that the piston member 1 and the link 3f partially rotate, or oscillate, through an angle equal to 2y, i.e., twice the maximum inclination of the link 3f to the axis of rotation of the crank disc 5f. Thus, the axis of the bore 4f intersects the axis of rotary motion of the crank disc 5f and makes an angle therewith equal to about one quarter of the angle through which the piston member 1 partially rotates.

From the above, it will be clear that although in the modified arrangement the link 3f is always inclined to the bore 4f, the maximum inclination of the link is about half of the maximum inclination in the arrangements shown in FIGS. 5 and 7A. Thus the degree of necking required of the link 3f to accommodate the inclination of the link 3f to the bore 4f is considerably reduced in the embodiment of FIGS. 14A and 14B, thus making the link 3f stronger.

Another advantage of the inclined bore is apparent from FIG. 14B. The force applied by the crank disc 5f to the piston member 1 is applied at the bottom of the link 3f away from the axis of the piston member 1. Thus, if the bore were perpendicular to the crank disk, such as in FIG. 7A, an anticlockwise couple would be applied to the piston member 1 as it is accelerated rearwardly, while a clockwise couple would be applied to accelerate it forwardly. However, with the inclined bore, the force applied by the crank disk 5f to accelerate the piston member 1 rearwardly has a downward component which provides a clockwise couple on the piston member 1 counteracting the anticlockwise couple; and similarly the force applied by the crank disk 5f to accelerate the piston member 1 forwardly has an upward component which provides an anticlockwise couple on the piston member 1 counteracting the clockwise couple. Thus the provision of the inclined bore also helps to balance the forces acting on the piston member 1. It will be appreciated that during deceleration periods of the rearward and forward movement of the piston member 1, the above forces and downward or upward components are reversed in direction, but still provide counteracting couples on the piston 1.

Figure 8:
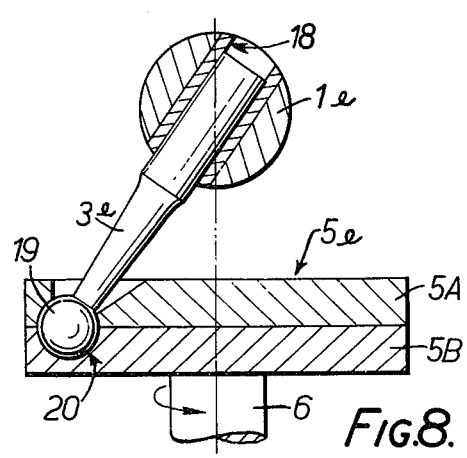
FIG. 8 is a sectional view of another form which parts of the mechanism of each of FIGS. 1 to 3 may take.

As an alternative to fixing one end of the link to the piston and allowing the other end of the link to swivel and slide relative to the crank disc, the arrangement shown in FIG. 8 may be adopted. In this arrangement the link 3e is slidably mounted in a bore 18 in the piston member 1e, the bore extending perpendicular to the longitudinal axis of the piston member. The other end of the link 3e is formed with a spherical head 19 and this is received in a spherical socket 20. In order to insert the head 19 into the socket 20, the crank disc 5e is formed in two halves 5A and 5B.

Mechanisms of the forms described above have various advantages. The simplicity of the components of the mechanisms make them easy and cheap to manufacture. The mechanisms are also compact and of low weight and are simple to balance: for example, the provision of a single weight on the crank arm 50 shown in FIG. 2 provides good counter-balance to the transverse forces arising from the swinging movement of the link 3. The movement of the reciprocated member is Simple Harmonic Motion which in some applications is an important advantage. Also some of the mechanisms can be used to impart a partial rotation to a member in addition to reciprocating the member; on the other hand, mechanisms based on the principle of FIG. 3 can be used to impart only reciprocational movement.

Figure 9:
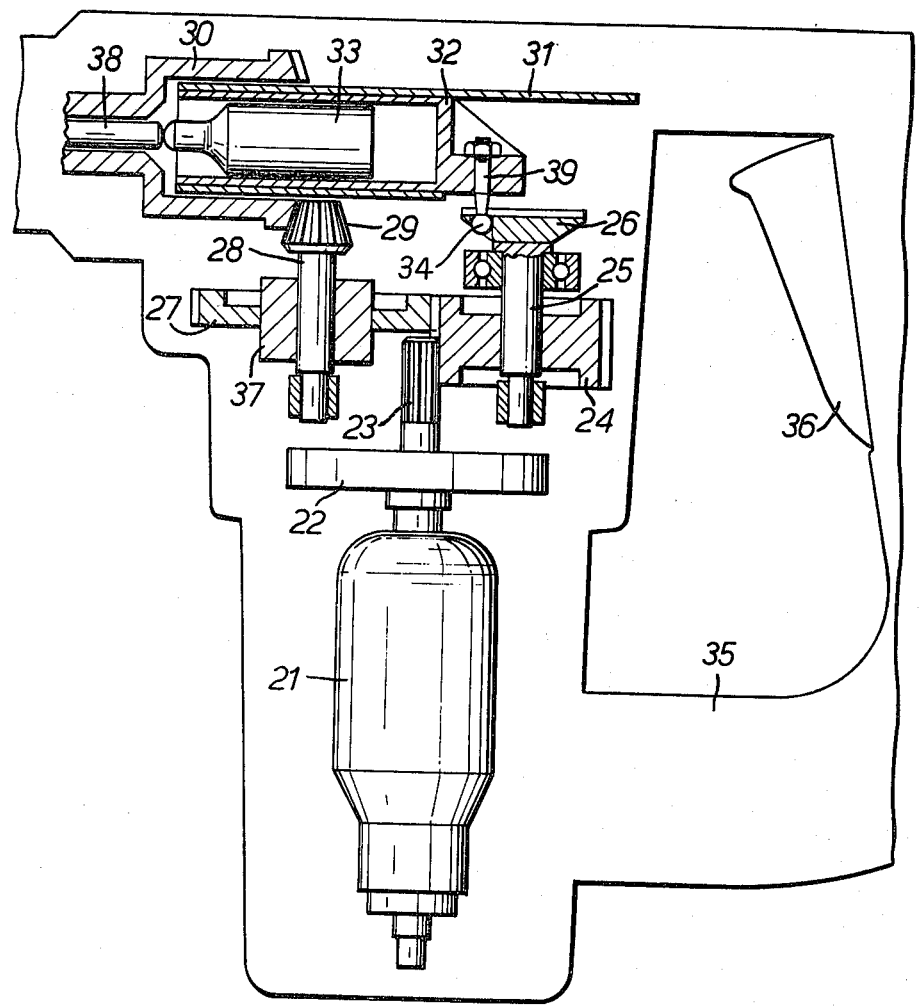
FIG. 9 is a schematic part sectional view of a rotary percussive drill embodying a form of the invention.

FIG. 9 shows a mechanism similar to that illustrated in FIGS. 1 and 7A incorporated in a percussive drill. The percussive drill is shown schematically, many of the parts of the drill not being illustrated, but suitable constructions for those parts not illustrated are already known. The percussive drill shown in FIG. 9 has a motor 21 with an output shaft carrying a fan 22 and terminating in a pinion 23 which meshes with a gear 24 mounted on a shaft 25. The shaft 25 carries a crank disc 26 at its upper end and this crank disc is of similar construction to the crank disc 5 and 5c shown in FIGS. 1 and 7A.

The gear 24 also meshes with a gear 27 connected via a clutch 37 (indicated schematically) to a shaft 28 carrying a bevel gear 29 which meshes with gear teeth formed on the end of a sleeve 30.

A guide tube 31 is located in the housing of the drill and a cylinder 32 is slidably mounted in the guide tube. A plunger 33 is in turn slidably mounted in the cylinder 32 and an air cushion is formed between the rear of the plunger 33 and the cylinder 32 so that the cylinder and plunger together define an air spring hammer arrangement of a form which is known per se. At the rear of the cylinder 32 a link 39 is connected, the link extending downwards from the cylinder and terminating in a ball-shaped end 34 which is received in a bore of the crank disc 26 in the same manner as shown in FIG. 7A.

In use, the percussive drill is gripped by its handle 35 and the operator depresses a trigger 36 on the handle to actuate the motor 21. Rotation of the pinion 23 rotates the crank disc 26 and, in a manner which has already been described, this causes reciprocation together with a cyclic partial rotation of the cylinder 32. Reciprocation of the cylinder 32 causes the plunger 33 to reciprocate and strike the end of a shaft 38 which may be the end of a drill bit or an intermediate member which transmits the blow from the plunger 33 to a drill bit or other operating tool member. Rotation of the pinion 23 also rotates the gear 27 which in turn rotates the sleeve 30; the sleeve 30 is coupled to the drill bit in a manner not shown such that rotation of the sleeve 30 rotates the drill bit.

Although the drill illustrated in FIG. 9 is a rotary percussive drill, the mechanism may also be used in a non-rotary percussive drill. Also any of the other forms of mechanism shown in FIGS. 1 through 8 may be used to drive the air spring hammer arrangement.

Figure 10A:
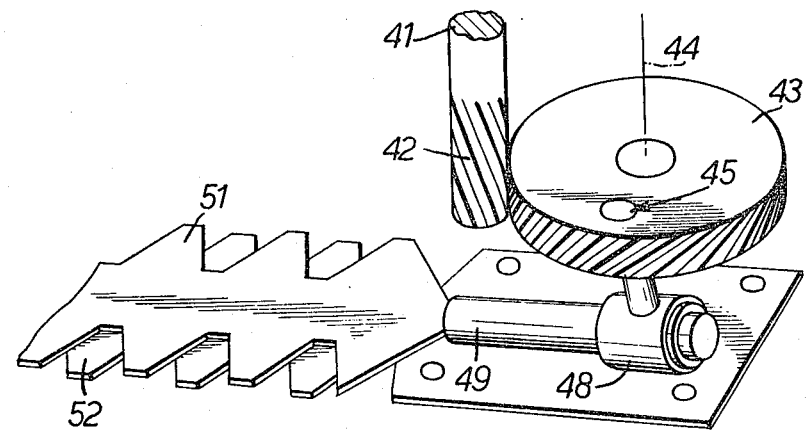
FIG. 10A is a perspective schematic view illustrating the drive mechanism of a hedge trimmer embodying the invention.
Figure 10B:
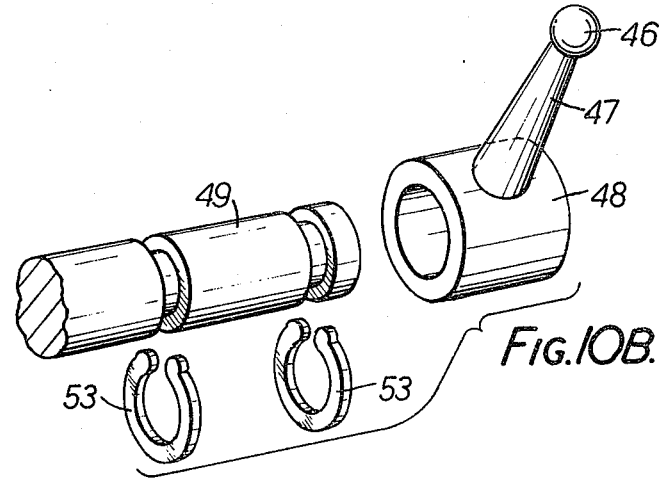
FIG. 10B is an exploded perspective view of a part of the hedge trimmer of FIG. 10A.

FIGS. 10A and 10B illustrate how the mechanism shown in FIGS. 3 and 7A may be incorporated in a hedge trimmer. The hedge trimmer has a motor (not shown) with an output shaft 41 on the end of which a pinion 42 is formed. The pinion meshes with a crank disc 43 mounted for rotation about its central axis 44. The crank disc is of the construction shown in FIGS. 3 and 7A and has a bore 45 in which the ball shaped end 46 of a link 47 is slidably and swivelably received. The other end of the link 47 is connected to a short sleeve 48 rotatably mounted on a shaft 49 and restrained against axial movement relative to the shaft 49 by clips 53. The shaft 49, which forms an output member, is connected to the blade 51 of the hedge trimmer; the blade 51 is mounted on a fixed blade 52 for reciprocating movement relative thereto and forms an operating tool member.

When in use the motor of the hedge trimmer is actuated, the crank disc 43 (corresponding to the crank discs 5 and 5c in FIGS. 3 and 7A) is rotated so that the sleeve 48 is reciprocated and subjected to a cyclic partial rotation. The reciprocation of the sleeve 48 is transmitted to the blade 51 reciprocating the blade 51 relative to the fixed blade 52.

Figure 11:
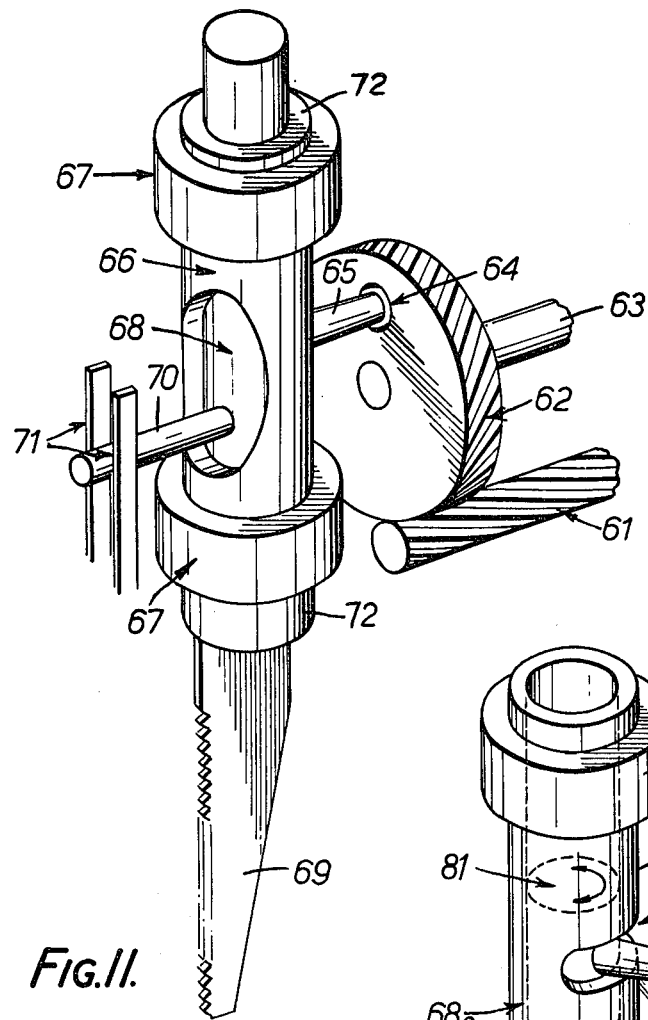
FIG. 11 is a perspective schematic view illustrating the drive mechanism of a reciprocating saw or jig saw embodying the invention.

FIG. 11 illustrates one way in which the mechanism shown in FIG. 3 may be incorporated in a reciprocating saw. The reciprocating saw has a motor (not shown) with an output shaft on the end of which a pinion 61 is formed. The pinion meshes with a crank disc 62 mounted for rotation on a central shaft 63. The crank disc has a bore 64 in which a link 65 is received, the coupling of the link 65 in the bore 64 being of any of the forms shown in FIGS. 5 to 7. The other end of the link 65 is connected to a sleeve 66 which is mounted for rotation and reciprocation in bearings 67 fixed in the housing (not shown) of the saw.

A plunger 68 carrying a saw blade 69 is rotatably mounted in the sleeve 66. Relative axial movement of the plunger 68 relative to the sleeve 66 is prevented by any suitable means; in the illustrated arrangement shoulders 72 are provided on the plunger 68 at each end of the sleeve 66. The plunger 68 is prevented from rotation by any suitable means; in the illustrated arrangement a rod 70 is fixed to the plunger at one end and the other end is constrained to move between a pair of parallel guides 71 fixed to the housing (not shown) of the saw.

When in use the motor of the saw is actuated the crank disc 62 (corresponding to the crank discs 5 and 5c in FIGS. 3 and 7A) is rotated so that the sleeve 66 is reciprocated and subjected to a cyclic partial rotation. The reciprocation of the sleeve 66 is transmitted to the plunger 68 thereby reciprocating the blade 69. Turning of the blade 69 is prevented by the engagement of the rod 70 between the guides 71.

Figure 12:
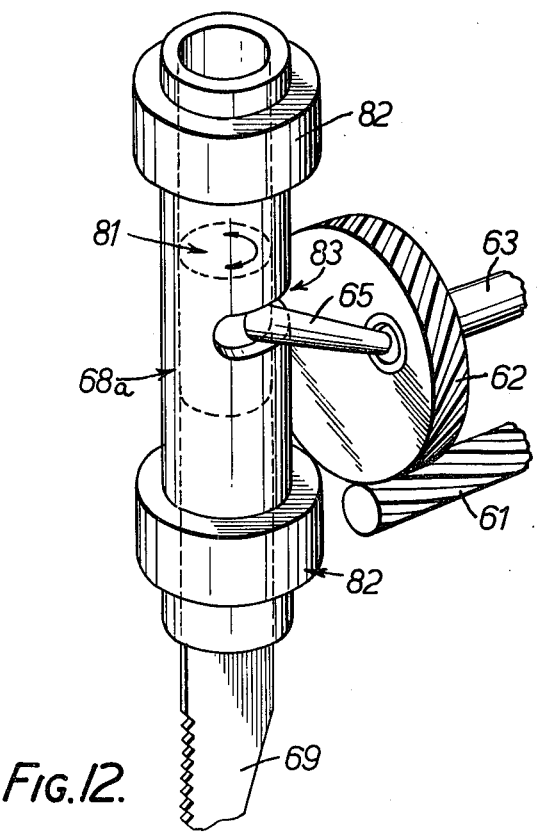
FIG. 12 is a perspective schematic view illustrating another drive mechanism of another reciprocating saw embodying the invention.

FIG. 12 illustrates a modified form of the arrangement shown in FIG. 11. In the arrangement of FIG. 12 the link 65 is connected to an inner cylindrical body 81 through slot 83 in the plunger 68a which in this arrangement is hollow. The plunger 68a carries the saw blade 69 as before and is slidably but non-rotatably mounted in bearings 82 fixed in the housing (not shown).

Thus, in operation of the arrangement shown in FIG. 12, the cylindrical body 81 is reciprocated and subjected to cyclic partial rotation by the link 65 driven by the crank disc 62. The engagement of the link 65 against the top and bottom walls of the slot 83 transmits the reciprocating movement to the plunger 68a thereby reciprocating the saw blade 69.

Figure 13:
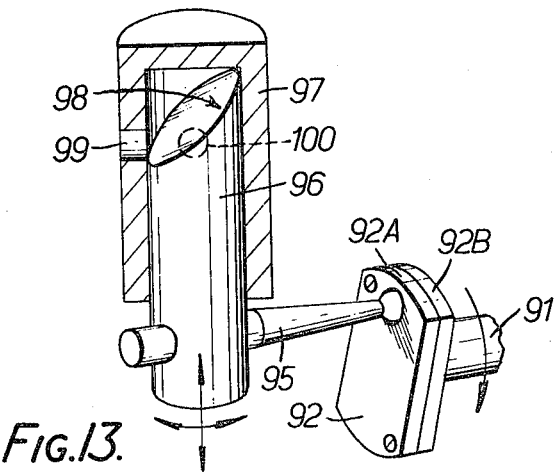
FIG. 13 is a perspective partly sectional schematic view of the drive mechanism of a hydraulic pump embodying the invention.

FIG. 13 illustrates how the mechanism shown in FIGS. 1, 2 and 8 may be incorporated in a hydraulic pump. The pump has a motor (not shown) connected to rotate a shaft 91 carrying a crank arm 92 which is formed in two halves 92A and 92B and has a spherical eccentric socket in which the spherical end of a link 95 is received. The other end of a link 95 is slidably received in a piston 96 which is slidably and rotatably mounted in a cylinder 97. Thus the mechanism connecting the crank arm 92 and the piston 96 is substantially the same as that shown in FIG. 8. The piston 96 is formed with an inclined upper face 98 and the cylinder 97 has an inlet port 99 and an exhaust port 100 located at the same level in the cylinder but spaced at an angle of about eighty degrees around the cylinder from each other.

When in use the motor of the pump is actuated, the crank arm 92 is rotated in the direction shown so that the piston 96 is reciprocated and subjected to a partial cyclic rotation. As the piston begins its downstroke it is rotated clockwise (as seen from above in FIG. 13) and the disposition of the inclined upper face 98 is such that this clockwise rotation opens the inlet port 99 but closes the exhaust port 100; FIG. 13 shows the position of the piston just after the beginning of the piston downstroke. The inlet port 99 remains open and the exhaust port 100 closed until near the end of the downstroke. As the piston brings its upstroke the anticlockwise rotation (as seen from above in FIG. 13) of the piston closes the inlet port 99 and opens the exhaust port 100; the ports remain in this condition until the piston approaches the end of its upstroke. Thus fluid is drawn into the cylinder 97 during the downstroke of the piston through the inlet port 99 and expelled through the exhaust port 100 during the upstroke of the piston.

In the above description the incorporation of the mechanism in various power tools is described. The particular tools are examples of tools in which the mechanism may be incorporated; the mechanism may be incorporated in other power operated tools.

What is claimed is:

1. A power operated tool, comprising:
   a prime mover;
   an output member for reciprocating an operating tool member when present;
   a power transmission mechanism arranged to transmit motion of the prime mover to said output member and comprising:
   (a) a first member mounted for reciprocatory and partial rotary motion,
   (b) a second member mounted for rotary motion about an axis transverse to the axis of reciprocatory motion of said first member, and having a bore therein eccentric of and inclined to said axis of rotary motion, and
   (c) a link coupled at one end to said first member, and at the other end to said second member, said other end being mounted in said bore for swivelling and sliding movement relative thereto,
   whereby rotation of said second member by the prime mover reciprocates said first member and also imparts a cyclic partial rotation to the first member during reciprocation thereof;
   said bore being inclined towards said axis of rotary motion in the general direction of said link from said other end to said one end; and
   the axis of said bore intersecting said axis of rotary motion and making an angle therewith equal to about one quarter of the angle through which said first member partially rotates.

2. A power tool, comprising:
   an electric motor;
   a mechanism arranged to be driven by the electric motor and to reciprocate an operating tool member when present;
   said mechanism comprising a first member mounted for reciprocation along an axis, a second member mounted for rotation about an axis at right angles to said axis of reciprocation, and a link coupled at one end to said first member and at the other end to said second member at a position spaced from said axis of rotation whereby rotation of said second member by the electric motor reciprocates said first member and also imparts a cyclic partial rotation thereto about said axis of reciprocation;
   said second member having a bore therein spaced from said axis of rotation and inclined there towards in the general direction of said link from said other end to said one end, said bore having an axis which intersects said axis of rotation and makes an angle therewith of about one quarter of the angle through which said first member partially rotates; and
   said one end of said link being rigidly connected to said first member, and said other end of said link being mounted in said bore for movement therein along the axis thereof;
   whereby said link is never aligned with the axis of said bore, and the inclination of said link to the axis of said bore in the middle portion of the path of reciprocation of said first member is reduced to less than it would be if said bore were not inclined.

3. The power tool recited in claim 2, wherein said other end of said link has a rounded head which slides and swivells in said bore.

4. The power operated tool recited in claim 3, further comprising a third member which is rotatably coupled to said first member in such a way that the reciprocation and partial rotation of said first member imparts reciprocation but not rotation to said third member.

* * * * *